Nov. 17, 1970 J. R. SHONNARD 3,541,253

APERTURE FOR FACSIMILE RECORDER IMAGING SYSTEM

Filed Aug. 5, 1968

3,541,253

APERTURE FOR FACSIMILE RECORDER IMAGING SYSTEM

John R. Shonnard, East Setauket, N.Y., assignor to Litton Systems, Inc., Beverly Hills, Calif., a corporation of Maryland Filed Aug. 5, 1968, Ser. No. 750,161
Int. Cl. H04n *1/06, 1/24*
U.S. Cl. 178—7.4 2 Claims

ABSTRACT OF THE DISCLOSURE

A field limiting aperture for a facsimile recorder imaging system in the form of a double rhomboid having a "V" configuration. This modifies the elemental recording area on the film which is exposed by the light source to minimize the "staircase" effect on the edges of a recorded line produced by the usual square or rectangular aperture.

BACKGROUND OF THE INVENTION

Field of the invention

Optical system for a facsimile recorder.

Description of the prior art

In the conventional photofacsimile recorder of the prior art, the optical system included an aperture plate disposed between the light source and the recording film. The aperture plate contained a square or rectangular aperture which determined the shape and size of each elemental area of the film exposed by the successive signals applied to the recorder lamp or light source.

The width of the elemental area (or "line feed") is usually about one one-hundredth of an inch, since in the recorded image at this resolution the dots merge to form a picture wherein the individual dots and lines are almost indistinguishable to the eye, and smaller areas for finer resolution would increase the time required to transmit the picture. When the picture contains lines at an angle of 45° or less to the direction of scan however, the edges of the lines present a ragged or "staircase" effect in the recorded copy, which is undesirable in the transmission of finger prints, for example. Reducing the size of the square aperture for finer resolution to overcome this objection is impractical on account of the increased transmitting time that would be required.

SUMMARY OF THE INVENTION

The object of the invention is to improve the aspect and/or legibility of photorecorded copy in facsimile or the like, where the copy is produced by exposing elemental areas of a light-sensitive film in response to electrical signals. This result is important, for example, in the reproduction of fingerprints transmitted by facsimile in police and security communication systems.

The stepped or "staircase" appearance of recorded lines which are inclined at an acute angle to the direction of scan is minimized by employing an aperture in the recorder imaging system in the form of a double rhomboid arranged in a V configuration having the apex thereof pointing in the direction of scan or in the opposite direction. In the transmission of fingerprints at a resolution of, say, 200 lines per inch, where the recorded print is examined with a magnifier, there is a definite improvement in the recording of fine lines with the novel aperture. At 100-line scanning, this improved aspect is quite apparent to the unaided eye.

DESCRIPTION OF THE PREFERRED EMBODIMENTS

Figure 1:
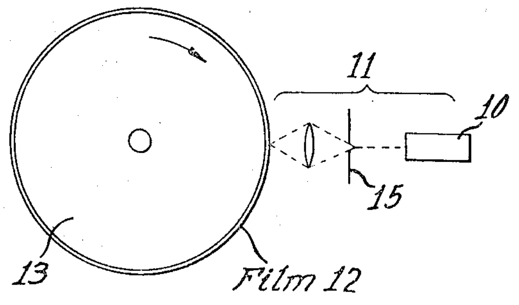
FIG. 1 is a schematic view of a facsimile recorder of the photographic type in which an aperture plate embodying the invention may be used.

Referring to FIG. 1 of the drawing, a conventional photorecorder for facsimile reception comprises a modulatable light source or recorder lamp 10 and an imaging system 11 for exposing elemental areas on the film 12 in response to received electrical signals as well known in the art. The film 12 may be supported for scanning on a rotating drum 13 driven by a constant-speed motor (not shown). The scanning mechanism in this case also involves relative movement between the drum and optical system 11 in a direction parallel to the axis of the drum but any equivalent scanning mechanism may be employed.

Figure 2:
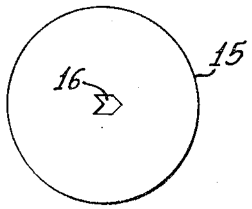
FIG. 2 is a detail view of the aperture plate to an enlarged scale.
Figures 3, 4, 5:
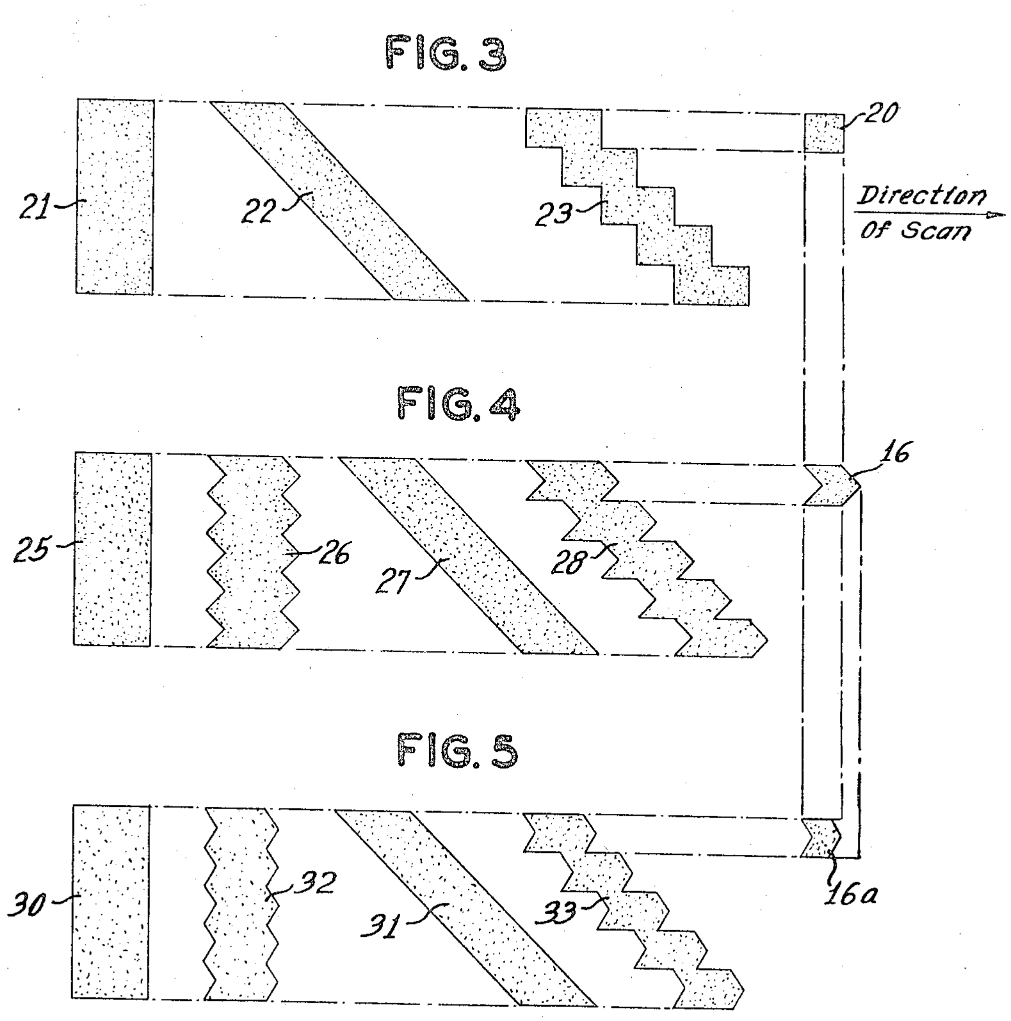
FIGS. 3, 4 and 5 are idealized representations to an enlarged scale of the recording of lines on a facsimile recorder with a square aperture and with apertures according to the invention.

The imaging system as shown includes an aperture plate 15 defining the elemental recording areas on the film 12. In accordance with the invention, the aperture plate 15 incorporates a special aperture 16 shown to an enlarged scale in FIG. 2. The shape of the aperture 16 is that of a double rhomboid arranged in a "V" configuration. As shown in FIGS. 3–5, this effects a noticeable improvement in the recording of fine lines in the copy.

FIG. 3 illustrates the recording produced with usual square aperture 20, enlarged about 25×. A line substantially normal to the direction of scan is recorded as represented by the area 21. In the case of a line inclined to the direction of scan an indicated at 22, the recorded line 23 has a stepped edge which appears as a ragged distortion of the orginal line and is objectionable where faithful reproduction is desired.

FIG. 4 illustrates the reduction in the "staircase" effect which is obtained by using the novel aperture 16. A line 25 normal to the direction of scan will be reproduced as shown at 26, and an inclined line 27 reproduced as shown at 28. The size of the indentations in the edges of lines 26 and 28 is so small as to be almost imperceptible to the eye.

The dimensions of the aperture 16 may be varied if desired. FIG. 5 illustrates the recording produced with an aperture 16*a* of reduced length and about two-thirds the area of the aperture 16. In the figure, the areas 30 and 31 represent the original lines of copy, and areas 32 and 33 represent the corresponding recorded lines.

It will be apparent that the novel aperture according to the invention results in a marked reduction in the distortion produced by a square aperture in the imaging system of a photofacsimile recorder. The necessity for finer resolution in the recording process to obtain the desired reproduction of fingerprints and the like is thereby avoided.

What is claimed is:

1. In a facsimile recorder imaging system, in combination, a recording medium, a recorder lamp for exposing said recording medium, and an imaging system for said recorder lamp having a field-limiting aperture substantially in the shape of a double rhomboid arranged in a V configuration oriented with respect to the direction of scan to reduce the stepped edge recording of lines of copy inclined to the direction of scan produced by a square aperture.

2. A facsimile recorder imaging system according to claim 1, in which each rhomboid of said double rhomboid is identical in shape.

References Cited

UNITED STATES PATENTS

| | | | |
|---|---|---|---|
| 2,738,730 | 3/1956 | Boyajean | 178—6.6 |
| 1,717,781 | 6/1929 | Ives | 178—7.4 |

BERNARD KONICK, Primary Examiner

S. B. POKOTILOW, Assistant Examiner

U.S. Cl. X.R.

178—6.7